US012634024B2

(12) United States Patent
Kirsch et al.

(10) Patent No.: US 12,634,024 B2
(45) Date of Patent: May 19, 2026

(54) METHOD FOR DETECTING A CHANGE IN A COMMUNICATIONS CHANNEL SYSTEM, AND RADIO MODULE AND RADIO SYSTEM

(71) Applicant: HELLA GmbH & Co. KGaA, Lippstadt (DE)

(72) Inventors: Oliver Kirsch, Wuppertal (DE); Ludger Weghaus, Lippstadt (DE); Roman Curkin, Lippstadt (DE); Mirjam Holbach, Dortmund (DE); Joachim Olk, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 393 days.

(21) Appl. No.: 18/243,481

(22) Filed: Sep. 7, 2023

(65) Prior Publication Data

US 2023/0421275 A1 Dec. 28, 2023

Related U.S. Application Data

(63) Continuation of application No. PCT/EP2021/068348, filed on Jul. 2, 2021.

(30) Foreign Application Priority Data

Mar. 8, 2021 (DE) ..................... 10 2021 105 531.8

(51) Int. Cl.
*H04B 17/364* (2015.01)

(52) U.S. Cl.
CPC ................................. *H04B 17/364* (2015.01)

(58) Field of Classification Search
CPC .............. H04B 17/364; H04B 17/3911; H04B 1/71637; H04B 7/0851; H04B 7/0857;
(Continued)

(56) References Cited

U.S. PATENT DOCUMENTS

2013/0210474 A1* 8/2013 Kyosti ............... H04B 17/3911
455/517
2016/0205006 A1* 7/2016 Kim ..................... H04B 17/364
(Continued)

FOREIGN PATENT DOCUMENTS

DE 102010034191 A1 2/2012

OTHER PUBLICATIONS

International Search Report dated Nov. 18, 2021 in corresponding application PCT/EP2021/068348.

*Primary Examiner* — Lana N Le
(74) *Attorney, Agent, or Firm* — Muncy, Geissler, Olds & Lowe, P.C.

(57) ABSTRACT

A method and system to detect a change in a communications channel system. An ultra-wideband transmitted signal is transmitted and a received signal is received. At least one channel impulse response of a communications channel is determined. The determined channel impulse responses are adapted to a known channel impulse response of the communications channel to produce a respective adapted channel impulse response in such a manner that a correlation coefficient resulting from the determined channel impulse response and the known channel impulse response increases. The adapted channel impulse responses are filtered in a time direction via a filter unit to obtain a specific filter signal of the filtered, adapted channel impulse responses of the communications channel. The change in the communications channel system is detected at least on the basis of the specific filter signal of the at least one communications channel.

18 Claims, 6 Drawing Sheets

(58) Field of Classification Search
CPC ............. H04L 25/0202; H04L 25/0204; H04L
25/0212; H04L 2027/0065; H04L
25/03019; H04L 25/03057; H04L 9/0875;
H04L 25/0224; H04L 2209/805
See application file for complete search history.

(56) References Cited

U.S. PATENT DOCUMENTS

| | | | |
|---|---|---|---|
| 2017/0212210 A1* | 7/2017 | Chen .................... | H04B 17/364 |
| 2023/0141889 A1* | 5/2023 | Marupaduga ........ | H04B 17/391 |
| 2024/0151841 A1* | 5/2024 | Weisgerber ............ | G01S 7/415 |
| 2025/0234227 A1* | 7/2025 | Fahim .................... | H04L 9/087 |

\* cited by examiner

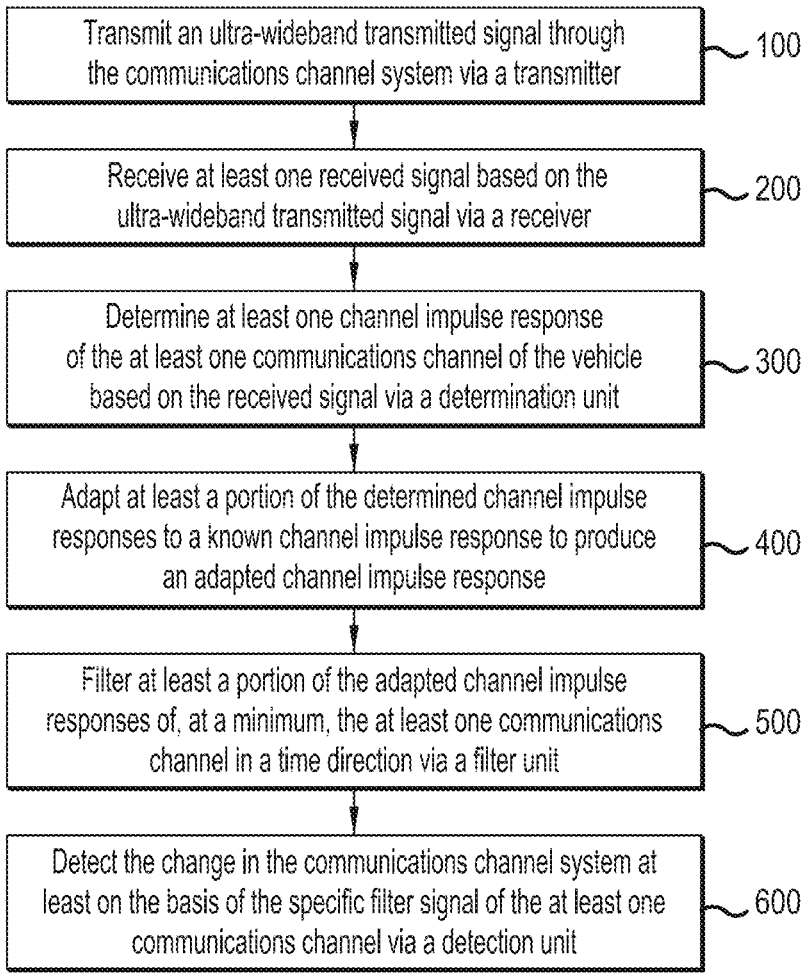

Transmit an ultra-wideband transmitted signal through
the communications channel system via a transmitter — 100

Receive at least one received signal based on the
ultra-wideband transmitted signal via a receiver — 200

Determine at least one channel impulse response
of the at least one communications channel of the vehicle
based on the received signal via a determination unit — 300

Adapt at least a portion of the determined channel impulse
responses to a known channel impulse response to produce
an adapted channel impulse response — 400

Filter at least a portion of the adapted channel impulse
responses of, at a minimum, the at least one communications
channel in a time direction via a filter unit — 500

Detect the change in the communications channel system at
least on the basis of the specific filter signal of the at least one
communications channel via a detection unit — 600

Fig. 1

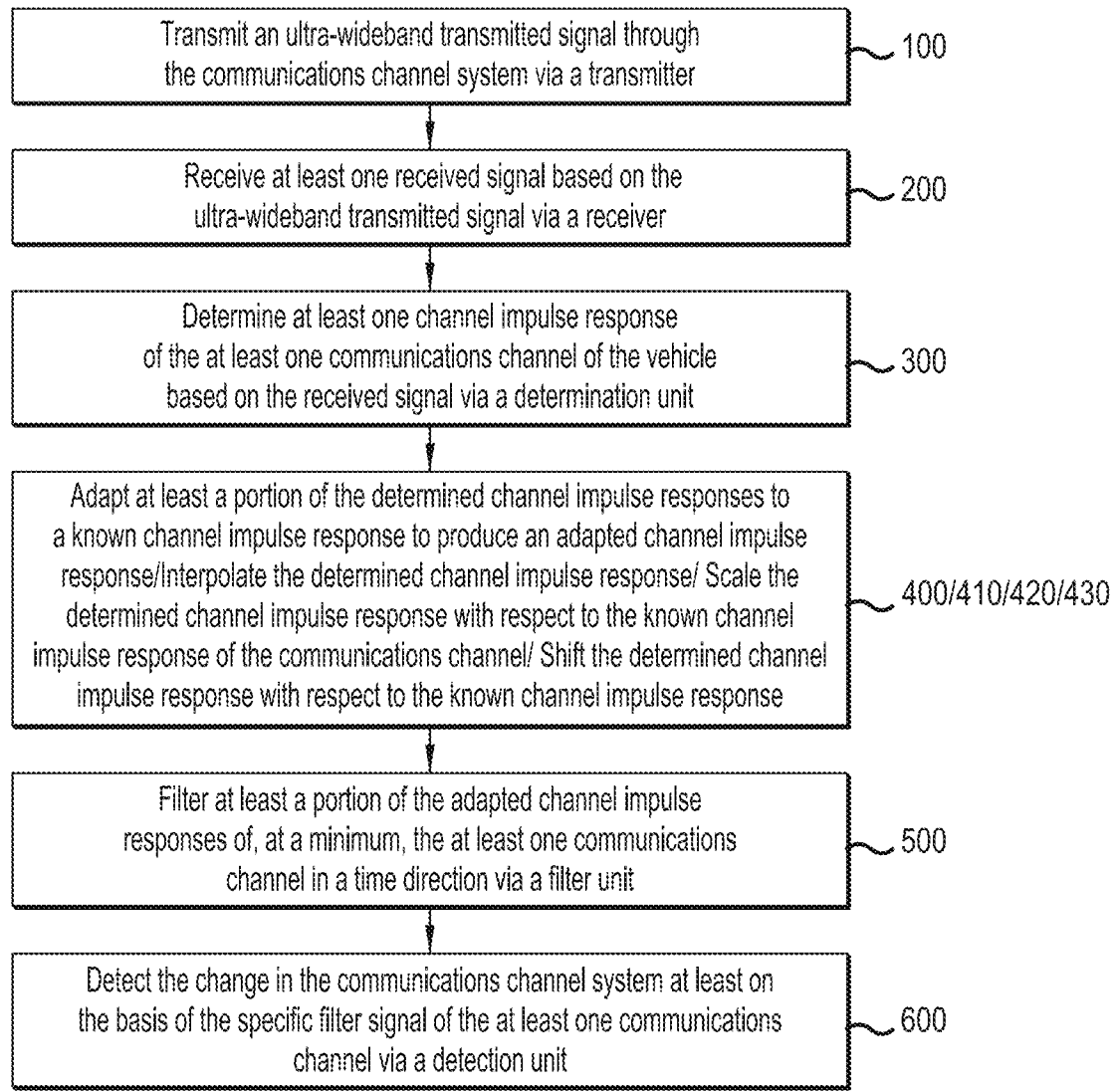

Transmit an ultra-wideband transmitted signal through
the communications channel system via a transmitter          ⌐ 100

Receive at least one received signal based on the
ultra-wideband transmitted signal via a receiver          ⌐ 200

Determine at least one channel impulse response
of the at least one communications channel of the vehicle
based on the received signal via a determination unit          ⌐ 300

Adapt at least a portion of the determined channel impulse responses to
a known channel impulse response to produce an adapted channel impulse
response/Interpolate the determined channel impulse response/ Scale the
determined channel impulse response with respect to the known channel
impulse response of the communications channel/ Shift the determined channel
impulse response with respect to the known channel impulse response          ⌐ 400/410/420/430

Filter at least a portion of the adapted channel impulse
responses of, at a minimum, the at least one communications
channel in a time direction via a filter unit          ⌐ 500

Detect the change in the communications channel system at least on
the basis of the specific filter signal of the at least one communications
channel via a detection unit          ⌐ 600

Fig. 2

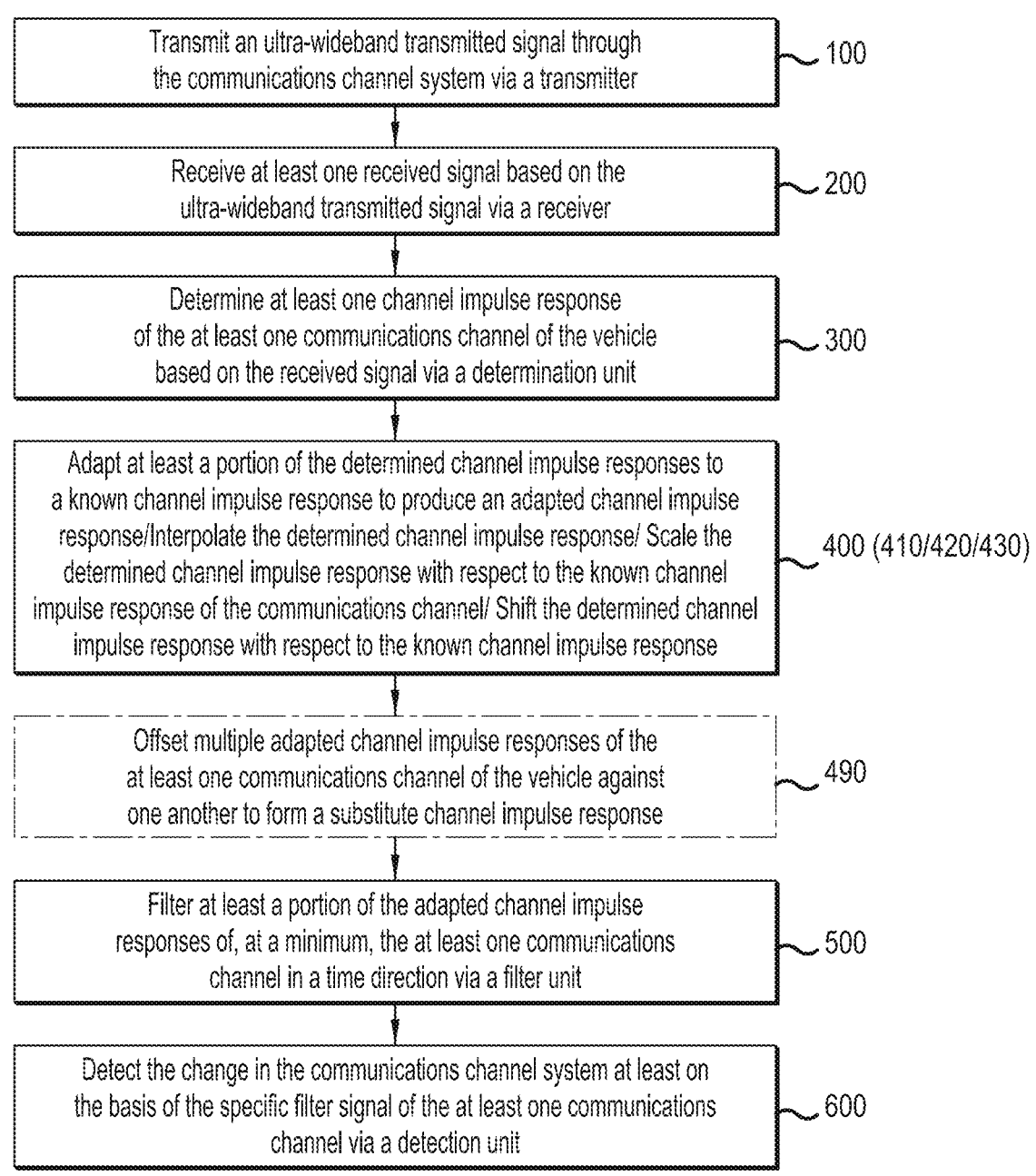

Transmit an ultra-wideband transmitted signal through the communications channel system via a transmitter ~ 100

Receive at least one received signal based on the ultra-wideband transmitted signal via a receiver ~ 200

Determine at least one channel impulse response of the at least one communications channel of the vehicle based on the received signal via a determination unit ~ 300

Adapt at least a portion of the determined channel impulse responses to a known channel impulse response to produce an adapted channel impulse response/Interpolate the determined channel impulse response/ Scale the determined channel impulse response with respect to the known channel impulse response of the communications channel/ Shift the determined channel impulse response with respect to the known channel impulse response ~ 400 (410/420/430)

Offset multiple adapted channel impulse responses of the at least one communications channel of the vehicle against one another to form a substitute channel impulse response ~ 490

Filter at least a portion of the adapted channel impulse responses of, at a minimum, the at least one communications channel in a time direction via a filter unit ~ 500

Detect the change in the communications channel system at least on the basis of the specific filter signal of the at least one communications channel via a detection unit ~ 600

Fig. 3

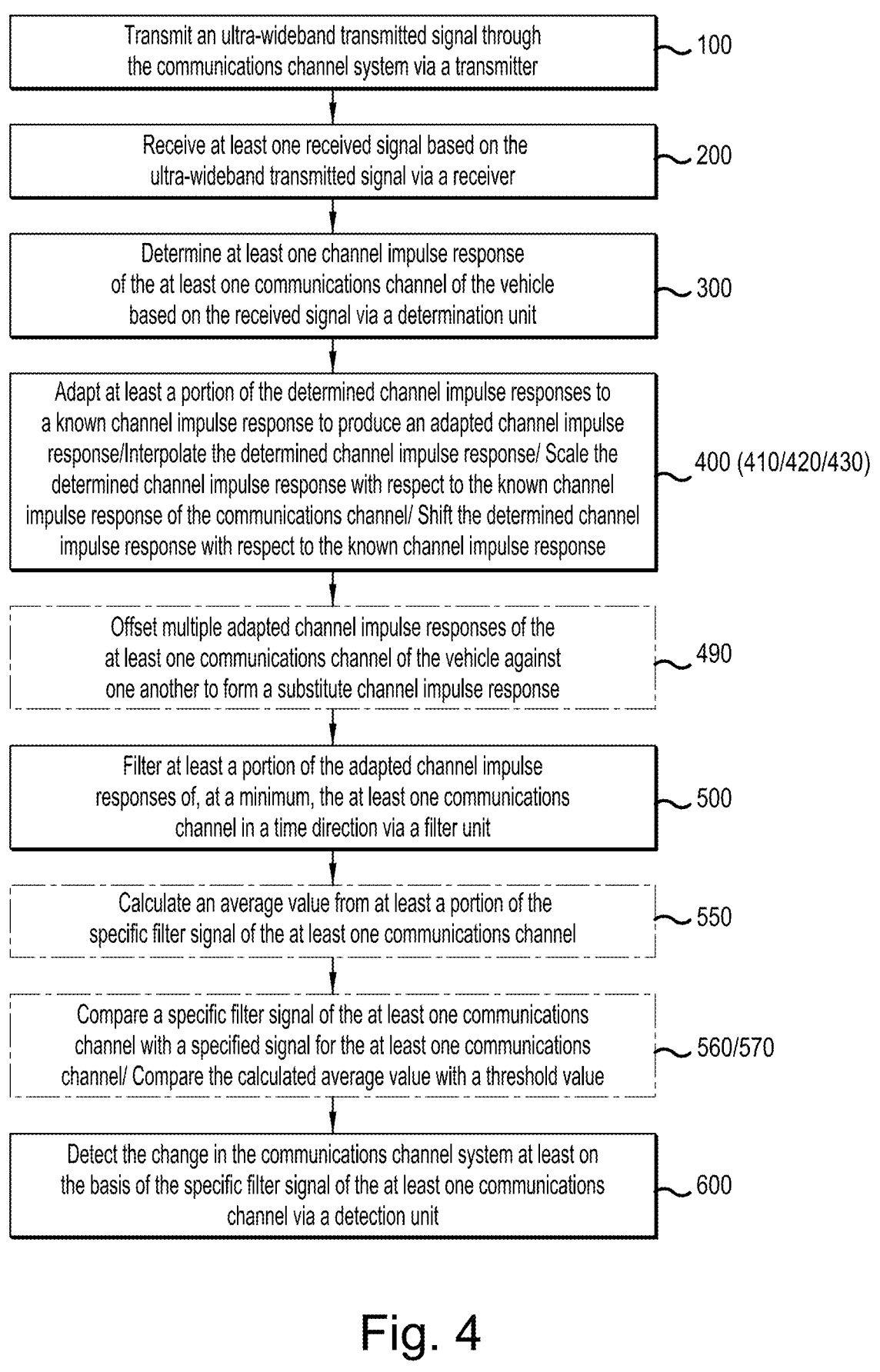

Transmit an ultra-wideband transmitted signal through
the communications channel system via a transmitter  ~ 100

Receive at least one received signal based on the
ultra-wideband transmitted signal via a receiver  ~ 200

Determine at least one channel impulse response
of the at least one communications channel of the vehicle
based on the received signal via a determination unit  ~ 300

Adapt at least a portion of the determined channel impulse responses to
a known channel impulse response to produce an adapted channel impulse
response/Interpolate the determined channel impulse response/ Scale the
determined channel impulse response with respect to the known channel
impulse response of the communications channel/ Shift the determined channel
impulse response with respect to the known channel impulse response  ~ 400 (410/420/430)

Offset multiple adapted channel impulse responses of the
at least one communications channel of the vehicle against
one another to form a substitute channel impulse response  ~ 490

Filter at least a portion of the adapted channel impulse
responses of, at a minimum, the at least one communications
channel in a time direction via a filter unit  ~ 500

Calculate an average value from at least a portion of the
specific filter signal of the at least one communications channel  ~ 550

Compare a specific filter signal of the at least one communications
channel with a specified signal for the at least one communications
channel/ Compare the calculated average value with a threshold value  ~ 560/570

Detect the change in the communications channel system at least on
the basis of the specific filter signal of the at least one communications
channel via a detection unit  ~ 600

Fig. 4

METHOD FOR DETECTING A CHANGE IN A COMMUNICATIONS CHANNEL SYSTEM, AND RADIO MODULE AND RADIO SYSTEM

This nonprovisional application is a continuation of International Application No. PCT/EP2021/068348, which was filed on Jul. 2, 2021, and which claims priority to German Patent Application No. 10 2021 105 531.8, which was filed in Germany on Mar. 8, 2021, and which are both herein incorporated by reference.

BACKGROUND OF THE INVENTION

Field of the Invention

The present invention relates to a method for detecting a change in a communications channel system of a vehicle, to a radio module, and to a radio system.

Description of the Background Art

Ultra-wideband (UWB) is a radio technology in which a transmitted signal with low power is transmitted over a wide frequency range so that occupied frequency bands are essentially not disturbed. The transmitted signal includes individual pulses for this purpose. Depending on the modulation method used, the amplitude, polarity, and position of the individual pulses can be changed.

A transmitter for transmitting a transmitted signal and a receiver for receiving a received signal based on the transmitted signal can be arranged in a vehicle, for example an automobile, wherein a communications channel for transmitting the transmitted signal is determined by the environment. The communications channel can change as a result of a change in the environment, wherein a change in the communications channel can take place as a result of a detection of a change in the channel impulse response of the communications channel over time. A change in the communications channel can be caused by a person entering the vehicle, for example. However, the detection of an ("actual") change in the communications channel that is caused by, for example, a physical change in the vehicle, represents a challenge, since engineering components such as, e.g., the transmitter and/or the receiver can have engineering tolerances or inaccuracies. These engineering tolerances or inaccuracies can cause a detection unit for detecting the change in the communications channel system to disadvantageously detect something that is not an "actual" change in the communications channel, but rather an "apparent" change in the communications channel caused by engineering tolerances or inaccuracies.

For example, a sampling of the transmitted signal and/or of the received signal for determining a channel impulse response can be subject to a sampling inaccuracy. For this reason, amplitude fluctuations can occur on account of non-identical sampling times for the transmitted signal and the received signal. Consequently, detection of a change in the channel impulse response, wherein the change in the channel impulse response is based essentially on an "actual" change in the communications channel and not solely on engineering sampling inaccuracies, is disadvantageously made more difficult.

SUMMARY OF THE INVENTION

It is therefore an object of the present invention to at least partially overcome the above-described disadvantages. In particular, it is an object of the present invention to specify an especially simple and/or accurate and/or reliable detection of an ("actual") change in a communications channel system or in at least one communications channel of a communications channel system. An additional object of the present invention is, in particular, to specify an especially simple and/or economical and/or compact radio module or radio system for a detection of an ("actual") change in a communications channel system.

Features and details that are described in connection with the method according to the invention also apply in connection with the radio module according to the invention and/or the radio system according to the invention and vice versa in each case, so mutual reference is or can always be made with regard to the disclosure of the individual aspects of the invention.

According to a first aspect, the present invention discloses a method for detecting a change in a communications channel system of a vehicle having at least one communications channel. As one step, the method has a transmitting of an ultra-wideband transmitted signal through the communications channel system via a transmitter, and as another step, a receiving of at least one received signal based on the ultra-wideband transmitted signal via a receiver, and as another step, a determining of at least one channel impulse response of the at least one communications channel of the vehicle based on the received signal via a determination unit. These said steps are repeated multiple times in order to determine at least a multiplicity of channel impulse responses of the at least one communications channel. Another step of the method according to the invention is a respective adapting of at least a portion of the determined channel impulse responses of the multiplicity of channel impulse responses of the at least one communications channel to a known channel impulse response of the at least one communications channel of the vehicle to produce a respective adapted channel impulse response via an adapting unit in such a manner that a correlation coefficient resulting from the determined channel impulse response and the known channel impulse response increases. The method further includes, as an additional step, a filtering of at least a portion of the adapted channel impulse responses of, at a minimum, the at least one communications channel in a time direction via a filter unit to obtain a specific filter signal of the filtered, adapted channel impulse responses of the at least one communications channel. In addition, the method according to the invention has, as another step, a detecting of the change in the communications channel system at least on the basis of the specific filter signal of the at least one communications channel via a detection unit.

The method steps described above and those described below can be performed separately, together, once, repeatedly, chronologically in parallel, and/or sequentially in any desired order, insofar as is technically appropriate.

The vehicle is, for example, a motor vehicle, preferably a passenger car or a truck.

The change in the communications channel system is to be understood, in particular, as a change in the communications channel system over time. A change in the communications channel system is, in particular, a detection of a change in at least one communications channel of the communications channel system. If the communications channel system has multiple communications channels, then it is also possible that a change in the communications channel system exists when, in particular, a change in the respective communications channel has been detected for multiple communications channels, preferably for all communications channels. As a result, a detection of a change in the communications channel system can be especially reliable.

The detecting of the change in the communications channel system of the vehicle is for a monitoring of the vehicle, in particular. In other words, the detecting of the change in the communications channel system of the vehicle can be used for a monitoring of the vehicle. A method according to the invention for detecting the change in the communications channel system of the vehicle having the at least one communications channel for a monitoring of the vehicle can have, as an additional (activation) step, a closing, in particular locking, of the vehicle. The monitoring of the vehicle is preferably an interior and/or exterior monitoring of the vehicle. For example, an anti-theft protection can be ensured via the monitoring, in particular interior monitoring. Furthermore, the monitoring of the vehicle can also be for, or be used for, detecting an occupancy of at least one seat or multiple seats of the vehicle. A method according to the invention for detecting the change in the communications channel system of the vehicle having the at least one communications channel for detecting an occupancy of at least one seat can have, as an additional (activation) step, an unlocking of the vehicle and/or a starting of a drive motor for moving the vehicle, for example. It is also possible that the monitoring of the vehicle is for, or is used for, detecting at least one child or multiple children in the vehicle (Child Presence Detection).

Furthermore, the detecting of the change in the communications channel system of the vehicle can be, or can be used, for, in particular, a monitoring of a state of health, in particular a respiration, of at least one living being in the vehicle.

In particular, a communications channel of the communications channel system is formed with respect to a transmitter and a receiver as a result of an external and/or internal environment of the vehicle. The channel impulse response (CIR) can provide complete information on the effect of the communications channel on the ultra-wideband transmitted signal.

It is additionally possible that the communications channel system has multiple communications channels. Consequently, an area of a vehicle that is "hidden" for one combination transmitter/receiver can be made "visible" via another combination transmitter/receiver. For example, a vehicle can have multiple transmitters and one receiver or the vehicle includes one transmitter and multiple receivers to form multiple communications channels. In particular, the vehicle can also have multiple transmitters and multiple receivers in order to form multiple communications channels. As a result, the detection of a change in the communications channel system can be especially reliable.

The determining of a channel impulse response of a communications channel of the communications channel system of the vehicle preferably is accomplished through a correlating, in particular cross-correlating, of the received signal with the ultra-wideband transmitted signal. For example, the ultra-wideband transmitted signal can be stored in a memory of a radio module according to the invention or of a radio system according to the invention for the correlating, in particular the cross-correlating, in order to determine the channel impulse response. Advantageously, the determining of the channel impulse response of the communications channel can be accomplished especially simply as a result. Advantageously, a cross-correlation function obtained through the cross-correlating of the received signal with the ultra-wideband transmitted signal can represent the channel impulse response of the communications channel. Furthermore, the channel impulse response is, in particular, a function of a time, in particular of a delay time. A possible multipath propagation of the ultra-wideband transmitted signal can be detected on the basis of the channel impulse response, wherein the detection of a possible multipath propagation also depends, in particular, on the delay time, the length of time a channel impulse response is measured (time duration of the transmitted signal).

The correlation coefficient that results from the determined channel impulse response and the known channel impulse response reflects, in particular, the similarity of the determined channel impulse response to the known channel impulse response. The correlation coefficient is, in particular, a cross-correlation coefficient of a cross-correlation function obtained through the cross-correlating of the determined channel impulse response with the known channel impulse response, very preferably a maximum cross-correlation coefficient of a cross-correlation function obtained through the cross-correlating of the determined channel impulse response with the known channel impulse response.

Since the ultra-wideband transmitted signal is transmitted over a communications channel via the transmitter, the ultra-wideband transmitted signal can change on account of the communications channel so that the ultra-wideband transmitted signal sent by the transmitter and the received signal received by the receiver may differ. This is the reason why cross-correlating and/or cross-correlation and/or cross-correlation coefficient are preferably referred to in this document instead of autocorrelating or autocorrelation or autocorrelation coefficient. It should also be mentioned, however, that the cross-correlating can be understood as autocorrelating and/or that the cross-correlation coefficient can be understood as autocorrelation coefficient and/or that the cross-correlation function can be understood as autocorrelation function, particularly under special circumstances.

The respective adapting of the determined channel impulse responses to a known channel impulse response of the vehicle to produce a respective adapted channel impulse response can be understood, in particular, as a calculation of a respective adapted channel impulse response by an adapting of a determined channel impulse response to a known channel impulse response of the vehicle. Expressed in other words, in each case a determined channel impulse response, for example a channel impulse response determined by a correlating of the received signal with the ultra-wideband transmitted signal, is adapted or adjusted to a known channel impulse response of the vehicle, for example a channel impulse response determined earlier in time, and in this way the respective adapted channel impulse response is obtained.

A change in the channel impulse response over time can be made detectable by the filtering in a time direction of at least a portion of the adapted channel impulse responses of, at a minimum, the at least one communications channel.

In particular, the similarity of the determined channel impulse response and the known channel impulse response is increased by the respective adapting of at least a portion of the determined channel impulse responses of the multiplicity of channel impulse responses of the at least one communications channel to a known channel impulse response of the at least one communications channel of the vehicle to produce a respective adapted channel impulse response via an adapting unit in such a manner that a correlation coefficient resulting from the determined channel impulse response and the known channel impulse response increases. It is therefore advantageously possible to better take into account, at least partially, engineering tolerances and/or engineering inaccuracies, for example of the radio module or of the radio system, for detecting an "actual" change in the communications channel system of the vehicle. For example, sampling inaccuracies as engineering inaccuracies can be better taken into account. Consequently, a "quiet" time sequence of multiple channel impulse responses can be produced. In particular, a change in a communications channel over time can become detectable at least at one characteristic point or multiple characteristic points of the channel impulse response or channel impulse responses. A characteristic point of the channel impulse response can be a local maximum of the channel impulse response. In particular, local maxima indicate time-delayed echoes and/or reflectors of the communications channel. Therefore, an "actual" change in at least one communications channel of a communications channel system can be better distinguished in an especially simple, accurate, and reliable manner from an "apparent" change in the communications channel based on engineering tolerances and/or inaccuracies. Consequently, even a small change in a communications channel can advantageously be detected. Consequently, a monitoring of the vehicle can be accomplished especially accurately.

In the phrases "change in the communications channel system," "change in the communications channel," "detecting a change in the communications channel system," "detecting a change in the communications channel," and the like, it can be assumed as a rule that an "actual" change is meant or that the phrase relates to an "actual" change. When it is helpful for purposes of comprehension or emphasis, the word "actual" or "apparent" is added in some cases.

It can be advantageous in a method according to the invention when the specific filter signal of the at least one communications channel is compared with a specified signal for the at least one communications channel for the purpose of detecting the change in the communications channel system on the basis of at least the specific filter signal of the at least one communications channel. Consequently, a change in the communications channel of the communications channel system can be detected in an especially simple, accurate, and reliable manner. The specified signal can be, in particular, a specified, dynamic signal. The specified, dynamic signal can change or be redetermined in the course of time. In particular, the redetermination can be initiated by an action. If, for example, a vehicle is to be monitored, then a redetermination of the specified signal can be initiated by a respective closing, in particular locking, of the vehicle as an action. Advantageously, a changed environment such as, e.g., a changed interior environment of the vehicle, can be taken into account as a result. An interior environment can change as a result of objects set down by the driver of the vehicle, for example.

Advantageously, in a method according to the invention, an average value can be calculated from at least a portion of the specific filter signal of the at least one communications channel, wherein the calculated average value is compared with a threshold value, for the purpose of detecting the change in the communications channel system at least on the basis of the specific filter signal of the at least one communications channel. Consequently, a change in the communications channel of the communications channel system can be detected especially reliably. In particular, the threshold value can be at least a multiple of a noise value based on the determined channel impulse responses. Furthermore, the threshold value is, in particular, a dynamic threshold value. The dynamic threshold value can change or be redetermined in the course of time. If, for example, a vehicle is to be monitored, then a redetermination of the threshold value can be initiated as an action by a respective closing, in particular locking, of the vehicle. Advantageously, a changed environment such as, e.g., a changed interior environment of the vehicle, can be taken into account as a result. Furthermore, the at least one portion of the specific filter signal of the at least one communications channel can, in particular, be buffered at least temporarily in order to be able to compute the average value from the buffered filter signal. The radio system, in particular the radio module, can have, in particular, a buffer for buffering. In addition, the calculation of the average value from at least one portion of the specific filter signal of the at least one communications channel is preferably a dynamic calculation of the average value. The dynamic calculation of the average value from the at least one portion of the specific filter signal can be accomplished according to the "sliding window principle." In this process, the chronologically oldest information item, in particular, of the specific filter signal of the filtered, adapted channel impulse responses is replaced by a chronologically newly obtained information item of the specific filter signal of the filtered, adapted channel impulse responses, for example in a buffer of the radio system. Consequently, a change in the communications channel of the communications channel system can be detected especially reliably.

It is furthermore possible, in particular, that, for the purpose of detecting the change in the communications channel system, a first average value for a first time period is dynamically calculated from the at least one portion of the specific filter signal of the at least one communications channel, in particular in a time direction, as well as that a second average value for a second time period is dynamically calculated from the at least one portion of the specific filter signal of the at least one communications channel, in particular in a time direction, wherein the first average value and the second average value are offset against one another to form a dynamic substitute value, and wherein the substitute value is compared with the threshold value, in particular a dynamic threshold value. A time period is to be understood, in particular, as a length of time in the time direction. In particular, the first time period is longer in duration than the second time period, wherein, in particular, the first time period and the second time period overlap. Consequently, the first average value advantageously changes more slowly over time than the second average value. The first average value can thus represent a baseline and serve as a low-pass filter. Preferably, the first average value and the second average value are subtracted one from the other, and a dynamic absolute value is formed, wherein the absolute value that is formed is compared with the threshold value in order to detect a change in the communications channel system. Consequently, a direct component can be eliminated in a simple manner. Furthermore, long-term drifts can be taken into account in this way so that a fixed threshold, in particular, can also be used. As a result, a monitoring of a state of health, in particular a respiration, of at least one living being in the vehicle can be accomplished especially advantageously, for example. For instance, the breathing of a living being can intrinsically result in a periodically or essentially periodically changing communications channel, wherein a calculated first average value for a first time period from the specific filter signal of this communications channel represents, in particular, a baseline. Subsequently, the first average value and a second average value are subtracted one from the other, and a dynamic absolute value is formed, wherein the absolute value that is formed is compared with the threshold value. A (an "additional")

change now occurring in the periodically changing or essentially periodically changing communications channel has less of an effect on the first average value with the time period that is longer in duration than on the second average value with the time period that is shorter in duration. Consequently, a monitoring of a state of health, in particular a respiration, of a living being can be accomplished especially advantageously.

To particular advantage, in a method according to the invention, the determined channel impulse response can be shifted with respect to the known channel impulse response for the respective adapting of the at least one portion of the determined channel impulse responses to the known channel impulse response of the at least one communications channel in order to increase the correlation coefficient. As a result, engineering tolerances and/or engineering inaccuracies, for example engineering inaccuracies in a sampling of the received signal, can advantageously be taken into account, so that an "actual" change in a communications channel can be detected in an especially reliable manner. The shifting is preferably at least a one-dimensional shifting. The shifting can also be a multidimensional shifting. The (one-dimensional) shifting is, in particular, a shifting of the determined channel impulse response with respect to the known channel impulse response in a delay time direction. Advantageously, engineering inaccuracies, for example engineering inaccuracies in a sampling of the received signal, can be taken into account in especially advantageous fashion as a result. Consequently, a "quiet" time sequence of multiple channel impulse responses can be produced, wherein, in particular, the multiple channel impulse responses are aligned with one another to especially good advantage at least at one characteristic point or at multiple characteristic points. In particular, the determined channel impulse response is shifted with respect to the known channel impulse response of the communications channel, in particular in such a manner that the similarity of the determined channel impulse response and the known channel impulse response increases. Very preferably, the determined channel impulse response is shifted with respect to the known channel impulse response of the communications channel in a delay time direction in such a manner that a cross-correlation has an increased value, in particular the maximum value. Furthermore, the shifting of the determined channel impulse response with respect to the known channel impulse response of the communications channel can be a shifting relative to one another.

According to another preferred embodiment, in a method according to the invention, the determined channel impulse response can be scaled with respect to the known channel impulse response of the communications channel for the respective adapting of the at least one portion of the determined channel impulse responses of the at least one communications channel to the known channel impulse response of the at least one communications channel to increase the correlation coefficient. As a result, engineering tolerances and/or engineering inaccuracies, for example engineering inaccuracies in a sampling of the received signal, can advantageously be taken into account, so that an "actual" change in a communications channel can be detected in an especially reliable manner. In particular, amplitude fluctuations of channel impulse responses that are caused by non-identical sampling times for the ultra-wideband transmitted signal and the received signal can be better compensated for. In particular, a characteristic point of the determined channel impulse response is scaled, in particular normalized, with respect to a corresponding characteristic point of the known channel impulse response of the communications channel. Preferably, an amplitude of the determined channel impulse response as a characteristic point is scaled, in particular normalized, with respect to an amplitude of the known channel impulse response as a corresponding characteristic point.

It can be advantageous in a method according to the invention when the determined channel impulse response is interpolated in order to add at least one auxiliary interpolation point between two interpolation points of the determined channel impulse response for the respective adapting of the at least one portion of the determined channel impulse responses of the at least one communications channel to the known channel impulse response of the at least one communications channel to increase the correlation coefficient. Advantageously, therefore, a time resolution of the determined channel impulse response can be increased so that an "actual" change in a communications channel can be detected in an improved manner. In particular, a determined channel impulse response is a discrete-time signal or a discrete-time function with multiple interpolation points. The time resolution of the channel impulse response can be limited by engineering limitations, for example the sampling frequency. Multiple additional auxiliary interpolation points can be added between the multiple interpolation points of the determined channel impulse response via the interpolation of the determined channel impulse response. On the one hand, the curve of the channel impulse response over the delay time can be smoothed as a result, and thus the correlation coefficient that results from the determined channel impulse response and the known channel impulse response can be increased. On the other hand, a shifting of the determined channel impulse response with respect to the known channel impulse response can advantageously be accomplished in an improved manner in smaller (time) steps, as well. Consequently, the determined channel impulse response can be shifted with respect to the known channel impulse response of the communications channel in an improved manner, in particular such that the similarity of the determined channel impulse response and the known channel impulse response increases. Very preferably, the determined channel impulse response is shifted with respect to the known channel impulse response of the communications channel in a delay time direction in such a manner that a cross-correlation has an increased value, in particular the maximum value. Preferably, a polynomial is used between every two interpolation points, in particular between every two adjacent interpolation points, of the multiple interpolation points of the determined channel impulse response to add at least one auxiliary interpolation point between the two interpolation points, in particular between two adjacent interpolation points. The polynomial is preferably a third order polynomial. If the known channel impulse response is based on a channel impulse response determined earlier in time of the at least one communications channel, then the determined channel impulse response is interpolated in the same or essentially the same manner as the known channel impulse response, in particular. The determined channel impulse response and the known channel impulse response can thus have the same or essentially the same time resolution in the delay time direction. Consequently, the shifting can be especially simple.

Advantageously in a method according to the invention, at least a portion of the determined channel impulse responses of the multiplicity of channel impulse responses of the at least one communications channel can each be adapted to a channel impulse response of the at least one communications channel based on a channel impulse response determined earlier in time. Consequently, a change in the communications channel of the communications channel system can be detected especially simply and reliably. The channel impulse response based on a channel impulse response determined earlier in time should be understood, in particular, as the known channel impulse response of the at least one communications channel to which a determined channel impulse response is adapted according to the invention. In particular, a respective known channel impulse response to which a respective determined channel impulse response is adapted can be a dynamic channel impulse response. The channel impulse response determined earlier in time can be, for example, the channel impulse response determined chronologically directly before the respective determined channel impulse response in each case.

To particular advantage in a method according to the invention, at least a portion of the determined channel impulse responses of the multiplicity of channel impulse responses of the at least one communications channel can be adapted to the same known channel impulse response of the at least one communications channel. Consequently, an "actual" change in a communications channel can advantageously be detected in an especially simple and rapid manner. In particular, the same known channel impulse response of the at least one communications channel can be a channel impulse response based on at least one channel impulse response determined earlier in time. Furthermore, the same known channel impulse response can, in particular, be dynamic. In other words, the same known channel impulse response can change or be redefined in the course of time; for example, the same known channel impulse response can be redefined after a definable number of channel impulse responses. If, for example, a vehicle is to be monitored, then the same known channel impulse response can be redefined by a respective closing, in particular locking, of the vehicle.

According to another preferred embodiment, in a method according to the invention, a determined channel impulse response of the multiplicity of channel impulse responses of the at least one communications channel can be adapted to the known channel impulse response of the at least one communications channel of the respective adapted channel impulse response in such a manner that the correlation coefficient that results from the determined channel impulse response and the known channel impulse response is maximized. Consequently, a change in a communications channel system or in at least one communications channel of the communications channel system can be detected especially accurately and reliably. In particular, a determined channel impulse response of the multiplicity of channel impulse responses of the at least one communications channel is adapted to the known channel impulse response of the at least one communications channel of the respective adapted channel impulse response in such a manner that a cross-correlation coefficient of a cross-correlation function obtained through a cross-correlating of the determined channel impulse response with the known channel impulse response is maximized or essentially maximized. The adapting of a determined channel impulse response to the known channel impulse response can be, in particular, a shifting of the determined channel impulse response in a delay time direction and/or a scaling of the determined channel impulse response, in particular in the amplitude direction of the channel impulse response, and/or an interpolation of the determined channel impulse response. Consequently, a change in a communications channel system or in at least one communications channel of the communications channel system can be detected very especially accurately and very especially reliably.

It can be advantageous in a method according to the invention when the filtering of at least a portion of the adapted channel impulse responses of the at least one communications channel in the time direction is accomplished via a high-pass filter. Advantageously, a direct component of the adapted channel impulse responses can therefore be filtered out in the time direction, and a change in the at least one communications channel can be detected especially simply. In particular, the high-pass filtering of the at least one portion of the adapted channel impulse responses takes place in the time direction in each case for corresponding interpolation points or auxiliary interpolation points of the channel impulse responses.

Advantageously, in a method according to the invention, the ultra-wideband transmitted signal can have at least one sounding signal, preferably at least two different sounding signals. Consequently, an especially advantageous channel impulse response can be determined and a change in a communications channel system or in at least one communications channel of the communications channel system can be detected especially reliably. A sounding signal is, in particular, a specific, compressed, periodic pulse signal that has especially advantageous cross-correlation properties. The at least one sounding signal is preferably an Ipatov sequence. Advantageously, the channel impulse response of the at least one communications channel can be determined especially exactly through a cross-correlation of an Ipatov sequence as an ultra-wideband transmitted signal with the same Ipatov sequence. Furthermore, it is possible that the ultra-wideband transmitted signal has multiple sounding signals, in particular multiple different sounding signals, preferably multiple different Ipatov sequences. The multiple sounding signals are, in particular, transmitted alternately in chronological succession, wherein the channel impulse responses are determined and/or adapted and/or filtered in a manner according to the invention based on the multiple sounding signals. Consequently, a change in a communications channel system or in at least one communications channel of the communications channel system can be detected especially reliably.

According to another preferred embodiment, in a method according to the invention, multiple adapted channel impulse responses of the at least one communications channel of the vehicle can be offset against one another, in particular averaged, to form a substitute channel impulse response, chronologically before the filtering. It is therefore advantageously possible to better take into account engineering tolerances and/or engineering inaccuracies, for example engineering inaccuracies in a sampling of the received signal, so that an "actual" change in a communications channel can be detected in an especially reliable manner. In particular, multiple adapted, chronologically sequential channel impulse responses of the at least one communications channel of the vehicle can be offset against one another, in particular averaged, to form the substitute channel impulse response. In other words, multiple adapted channel impulse responses can be offset against one another in a time direction to form the substitute channel impulse response. If the ultra-wideband transmitted signal has multiple different sounding signals, then it is also possible, in particular, that adapted, chronologically sequential channel impulse responses based thereon of the at least one communications channel of the vehicle are offset against one another, in particular averaged, to form the substitute channel impulse response. In particular, it is also possible that multiple adapted channel impulse responses in the delay time are offset against one another to form the substitute channel impulse response.

It can be advantageous in a method according to the invention when multiple receivers each receive a received signal based on the transmitted ultra-wideband transmitted signal in order to detect the change in the communications channel system of the vehicle. Consequently, an area of a vehicle that is "hidden" for one combination transmitter/ receiver can be made "visible" via another combination transmitter/receiver, so that the detection of a change in the communications channel system is especially reliable. The multiple receivers are, in particular, arranged spatially apart from one another, in particular are arranged spatially apart from one another in and/or on the vehicle. Channel impulse responses of the respective communications channel of the vehicle can be determined based on the respective received signal of the multiple receivers. The channel impulse responses determined in each case can be adapted and/or filtered in a manner according to the invention in order to detect a change in the communications channel system on the basis of a specific filter signal of a respective communications channel. A change in the communications channel system already exists, in particular, when a change is detected in at least one communications channel of the communications channel system. Furthermore, the at least one transmitter for transmitting the ultra-wideband transmitted signal and a receiver for receiving the received signal based on the ultra-wideband transmitted signal can, in particular, form a module, in particular jointly form a radio module.

Advantageously, in a method according to the invention, multiple transmitters can each transmit an ultra-wideband transmitted signal in order to detect the change in the communications channel system of the vehicle. Consequently, an area of a vehicle that is "hidden" for one combination transmitter/receiver can be made "visible" via another combination transmitter/receiver, so that the detection of a change in the communications channel system is especially reliable. The multiple transmitters are, in particular, arranged spatially apart from one another, in particular are arranged spatially apart from one another in and/or on the vehicle.

To particular advantage, in a method according to the invention, the transmitting of the ultra-wideband transmitted signals via the multiple transmitters can take place in a time-shifted manner. As a result, the detection of a change in the communications channel system can be especially reliable. Preferably, a transmitter for transmitting the ultra-wideband transmitted signal and a receiver for receiving the received signal based on the ultra-wideband transmitted signal form a module in each case for this purpose. Consequently, the modules can take on the function of the transmitter by turns, wherein the non-transmitting modules take on the function of the receiver in each case. Consequently, a multiplicity of communications channels can be produced and a detecting of the change in the communications channel system can be accomplished especially advantageously.

According to a second aspect, the present invention discloses a radio module for a radio system for detecting a change in a communications channel system of a vehicle having at least one communications channel, wherein the radio module has at least one receiver for receiving a received signal based on the ultra-wideband transmitted signal. Furthermore, the radio module includes a determination unit for determining at least one channel impulse response of at least one communications channel of the vehicle based on the received signal, as well as an adapting unit for adapting at least one determined channel impulse response of a multiplicity of channel impulse responses to a known channel impulse response of the at least one communications channel of the vehicle to produce a respective adapted channel impulse response in such a manner that a correlation coefficient resulting from the determined channel impulse response and the known channel impulse response increases. In addition, the radio module has a filter unit for filtering at least a portion of the adapted channel impulse responses of, at a minimum, the at least one communications channel in a time direction to obtain a specific filter signal of the filtered, adapted channel impulse responses of the at least one communications channel. Also, the radio module includes a detection unit for detecting the change in the communications channel system at least on the basis of the specific filter signal of the at least one communications channel. The radio module can furthermore include, in particular, at least one transmitter for transmitting an ultra-wideband transmitted signal.

The radio module is, in particular, for a monitoring of, or for the purpose of monitoring, the vehicle. In other words, the radio module can be used for, or for the purpose of, monitoring the vehicle.

The radio module with the receiver, determination unit, adapting unit, filter unit, and detection unit constitutes, in particular, a physical unit for the vehicle. Consequently, a monitoring of the vehicle can be accomplished in an especially simple and energy-efficient manner, since a vehicle control unit can be shut down or placed in a quiescent mode, for example. In particular, a radio system according to the invention can have multiple such radio modules.

Furthermore, it is possible that the radio module as a physical unit has a transmitter in addition to the receiver, the determination unit, the adapting unit, the filter unit, and the detection unit. Consequently, the radio module can function as a transmitter and/or receiver. In particular, a radio system can have multiple such radio modules.

The detection unit, in particular of the radio module or of the radio system, can transmit a control signal to a vehicle control unit in order to initiate a definable response in the event of a detection of a change in the communications channel system or in the event of a detection of a change in at least one communications channel at least on the basis of the specific filter signal of the at least one communications channel. For example, an alarm can be initiated in the case of a monitoring of the vehicle. It is also possible that a definable response is not initiated until there are a multiplicity of detected changes in the at least one communications channel.

The radio module according to the second aspect of the invention thus has the same advantages as have already been described in relation to the method according to the invention in accordance with the first aspect of the invention.

According to a third aspect, the present invention discloses a radio system for detecting a change in a communications channel system of a vehicle having at least one communications channel, wherein the radio system is designed to carry out a method according to the invention.

The radio system can be, in particular, for a monitoring of, or for the purpose of monitoring, the vehicle. In other words, the radio system can be used for, or for the purpose of, monitoring the vehicle.

Preferably, the radio system according to the invention has at least one transmitter and at least one receiver. It is also possible, however, that the radio system has multiple transmitters and/or multiple receivers. Particularly in a radio system for a monitoring of the vehicle, the at least one receiver is part of a radio module according to the invention, which module has, as a physical unit, the receiver, a determination unit, an adapting unit, a filter unit, and a detection unit.

The radio system has, in particular, at least one receiver and/or a determination unit and/or an adapting unit and/or a filter unit and/or a detection unit and/or a transmitter. In particular, the receiver and/or the determination unit and/or the adapting unit and/or the filter unit and/or the detection unit and/or the transmitter can be arranged in a fixed location in and/or on the vehicle. It is also possible that a mobile element of the vehicle, for example a vehicle key, forms at least a part of the radio system. In particular, the mobile element can have the receiver and/or the determination unit and/or the adapting unit and/or the filter unit and/or the detection unit and/or the transmitter.

If the radio system has multiple receivers that are arranged spatially apart from one another, then the radio system can have a shared determination unit and/or adapting unit and/or filter unit and/or detection unit for the multiple communications channels. Consequently, the radio system can be especially compact and economical.

It can furthermore be advantageous when a radio system according to the invention has at least one radio module according to the invention as well as at least one transmitter for transmitting a transmitted signal, in particular an ultra-wideband transmitted signal, through a communications channel system.

The radio system according to the third aspect of the invention thus has the same advantages as have already been described in relation to the method according to the first aspect of the invention or, respectively, in relation to the radio module according to the second aspect of the invention.

Additional measures that improve the invention are evident from the description below regarding some exemplary embodiments of the invention that are schematically represented in the figures. All features and/or advantages, including design details, spatial arrangements, and method steps, that derive from the claims, the description, or the drawings, can be essential for the invention individually as well as in a variety of combinations. It should be noted in this regard that the figures have a merely descriptive character and are not intended to restrict the invention in any form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is an example of a method according to the invention;

FIG. 2 shows additional examples of a method according to the invention;

FIG. 3 is an example of a method according to the invention;

FIG. 4 is additional examples of a method according to the invention;

DETAILED DESCRIPTION

Figure 5:
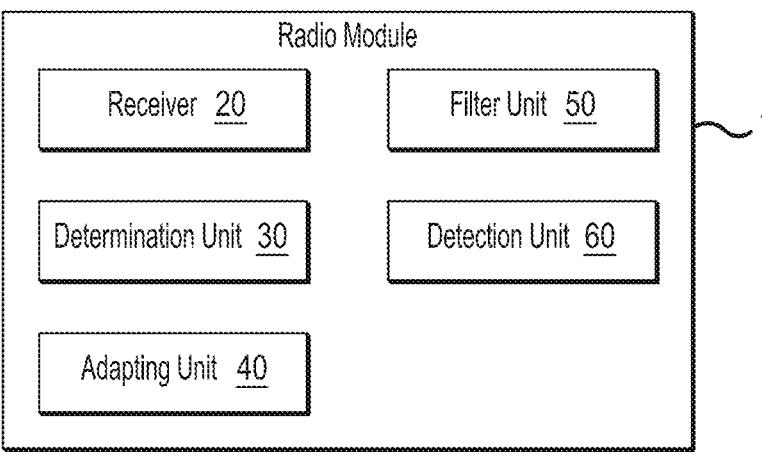
FIG. 5 is an example of a radio module according to the invention.

FIG. 1 shows an embodiment of a method according to the invention for detecting 600 a change in a communications channel system of a vehicle having at least one communications channel. The method has, as one step, a transmitting 100 of an ultra-wideband transmitted signal through the communications channel system via a transmitter 10, and as another step, a receiving 200 of at least one received signal based on the ultra-wideband transmitted signal via a receiver 20, and as another step, a determining 300 of at least one channel impulse response of the at least one communications channel of the vehicle based on the received signal via a determination unit 30. These said steps, which is to say transmitting 100 and receiving 200 and determining 300, are repeated multiple times in order to determine 300 at least a multiplicity of channel impulse responses of the at least one communications channel. In other words, a multiplicity of channel impulse responses is determined over time. Another step of the method according to the invention is a respective adapting 400 of at least a portion of the determined channel impulse responses of the multiplicity of channel impulse responses of the at least one communications channel to a known channel impulse response of the at least one communications channel of the vehicle to produce a respective adapted channel impulse response via an adapting unit 40 in such a manner that a correlation coefficient resulting from the determined channel impulse response and the known channel impulse response increases. As a result of this step according to the invention, a multiplicity of determined channel impulse responses of the at least one communications channel can be adapted 400 to one another, in particular shifted and/or scaled and/or interpolated, in such a manner that, for example, engineering inaccuracies such as sampling inaccuracies of a receiver 20 can be compensated for or taken into account in an improved manner. Consequently, a "quiet" time sequence of multiple channel impulse responses can be produced and a detection of an "actual" change in a communications channel system of a vehicle can be especially simple, accurate, and/or reliable. In particular, at least a portion of the determined channel impulse responses of the multiplicity of channel impulse responses of the at least one communications channel can each be adapted 400 to a channel impulse response of the at least one communications channel based on a channel impulse response determined earlier in time. Alternatively or in addition hereto, it is also possible that at least a portion of the determined channel impulse responses of the multiplicity of channel impulse responses of the at least one communications channel are adapted to the same known channel impulse response of the at least one communications channel. The method includes, as an additional step, a filtering 500 of at least a portion of the adapted channel impulse responses of, at a minimum, the at least one communications channel in a time direction via a filter unit

50 to obtain a specific filter signal of the filtered, adapted channel impulse responses of the at least one communications channel. The filtering can be accomplished via a high-pass filter, in particular. Moreover, the method according to the invention has, as another step, a detecting 600 of the change in the communications channel system at least on the basis of the specific filter signal of the at least one communications channel via a detection unit 60. In addition, when a change is detected in the communications channel system, the detection unit 60 can transmit a control signal to a control unit, in particular a vehicle control unit, in order to initiate an appropriate response, for example an alarm. A monitoring of a vehicle can be carried out with the method according to the invention.

FIG. 2 shows additional embodiments of a method according to the invention for detecting 600 a change in a communications channel system of a vehicle having at least one communications channel, wherein the methods in FIG. 2 likewise have the steps cited in relation to FIG. 1. In addition, in a method according to the invention, the determined channel impulse response can be interpolated 410 in order to add at least one auxiliary interpolation point between two interpolation points of the determined channel impulse response for the respective adapting 400 of the at least one portion of the determined channel impulse responses of the at least one communications channel to the known channel impulse response of the at least one communications channel to increase the correlation coefficient. Furthermore, in a method according to the invention, the determined channel impulse response can be scaled 420 with respect to the known channel impulse response of the communications channel for the respective adapting 400 of the at least one portion of the determined channel impulse responses of the at least one communications channel to the known channel impulse response of the at least one communications channel to increase the correlation coefficient. In addition, in a method according to the invention, the determined channel impulse response can be shifted 430 with respect to the known channel impulse response for the respective adapting 400 of the at least one portion of the determined channel impulse responses to the known channel impulse response of the at least one communications channel to increase the correlation coefficient. Preferably all three steps, which is to say interpolating 410, scaling 420, and shifting 430, are carried out. A preferred sequence of these steps is, in particular, that a determined channel impulse response is interpolated 410 first, then the determined channel impulse response is scaled 420 with respect to the known channel impulse response, and then the determined channel impulse response is shifted 430 with respect to the known channel impulse response, wherein these steps take place in such a manner that a correlation coefficient resulting from the determined channel impulse response and the known channel impulse response increases, wherein, in particular, the correlation coefficient is increased after the last of the three steps.

FIG. 3 shows another embodiment of a method according to the invention for detecting 600 a change in a communications channel system of a vehicle having at least one communications channel, wherein the method in FIG. 3 likewise additionally has, or can have, the steps cited in relation to FIG. 1 and/or FIG. 2. In addition, in a method according to the invention, multiple adapted channel impulse responses of the at least one communications channel of the vehicle can be offset against one another 490 to form a substitute channel impulse response chronologically before the filtering 500. In particular, multiple adapted, chronologically sequential channel impulse responses of the at least one communications channel of the vehicle can be offset against one another, in particular averaged 490, to form the substitute channel impulse response. Consequently, an especially information-rich channel impulse response can be obtained, and furthermore, an especially "quiet" time sequence of multiple substitute channel impulse responses can be produced, and a detection of an "actual" change in a communications channel system of a vehicle can be especially advantageous.

FIG. 4 shows additional embodiments of a method according to the invention for detecting 600 a change in a communications channel system of a vehicle having at least one communications channel, wherein the methods in FIG. 4 likewise can additionally have the steps cited in relation to FIG. 1 and/or FIG. 2 and/or FIG. 3. In addition, in a method according to the invention for detecting 600 the change in the communications channel system on the basis of at least the specific filter signal of the at least one communications channel, the specific filter signal of the at least one communications channel can be compared 560 with a specified signal for the at least one communications channel. In particular, an average value can be calculated 550 for this purpose from at least a portion of the specific filter signal of the at least one communications channel, wherein the calculated average value is compared 570 with a threshold value. For detecting 600 the change in the communications channel system, it is furthermore possible, in particular, that a first average value for a first time period is dynamically calculated in the time direction from the at least one portion of the specific filter signal of the at least one communications channel and also that a second average value for a second time period is dynamically calculated in the time direction from the at least one portion of the specific filter signal of the at least one communications channel, wherein the first time period is longer in duration than the second time period. The first average value can thus represent a baseline and be used for additional low-pass filtering. Preferably, the first average value and the second average value are subtracted one from the other, and an absolute value is formed, wherein the absolute value that is formed is compared with the threshold value in order to detect a change in the communications channel system. In particular, the threshold value can be at least a multiple of a noise value based on the determined channel impulse responses. Consequently, a change in the communications channel of the communications channel system can be detected especially reliably.

FIG. 5 shows an embodiment of a radio module 1 according to the invention for a radio system 90 for detecting a change in a communications channel system of a vehicle having at least one communications channel, wherein the radio module 1 has at least one receiver 20 for receiving a received signal based on the ultra-wideband transmitted signal. Furthermore, the radio module 1 includes a determination unit 30 for determining at least one channel impulse response of at least one communications channel of the vehicle based on the received signal, as well as an adapting unit 40 for adapting at least one determined channel impulse response of a multiplicity of channel impulse responses to a known channel impulse response of the at least one communications channel of the vehicle to produce a respective adapted channel impulse response in such a manner that a correlation coefficient resulting from the determined channel impulse response and the known channel impulse response increases. Moreover, the radio module 1 has a filter unit 50 for filtering at least a portion of the adapted channel impulse responses of, at a minimum, the at least one communications channel in a time direction to obtain a specific filter signal of the filtered, adapted channel impulse responses of the at least one communications channel. In addition, the radio module includes a detection unit 60 for detecting the change in the communications channel system at least on the basis of the specific filter signal of the at least one communications channel. In particular, the receiver 20, the determination unit 30, the adapting unit 40, the filter unit 50, and the detection unit 60 form a physical unit.

Figure 6:
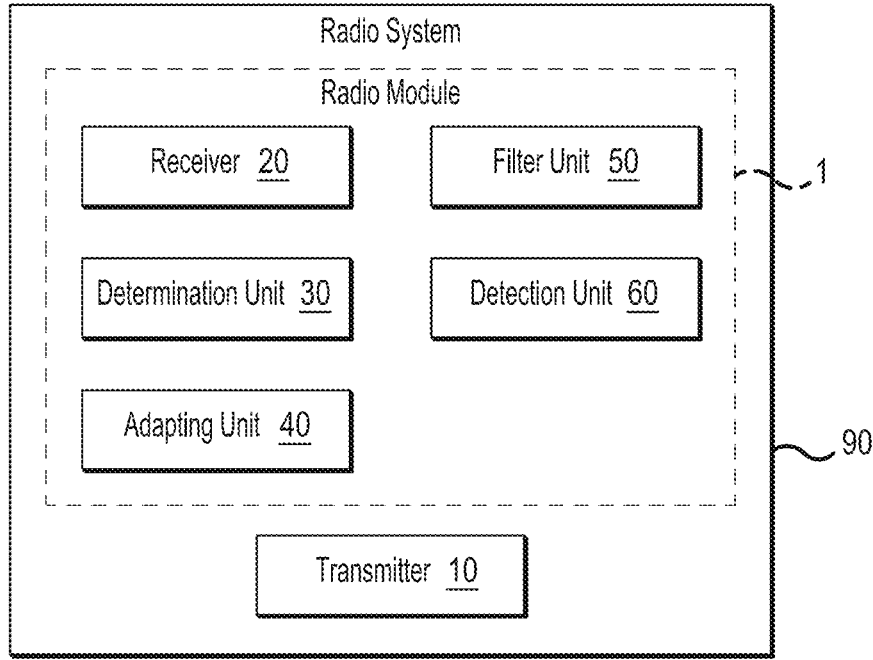
FIG. 6 is an example of a radio system according to the invention.

FIG. 6 shows an embodiment of a radio system 90 according to the invention for detecting a change in a communications channel system of a vehicle having at least one communications channel, wherein the radio system 90 is designed to carry out a method according to the invention for detecting a change in a communications channel system. The radio system 1 has, in particular, at least one radio module 1 according to the invention such as has already been described in FIG. 5, as well as at least one transmitter 10 for transmitting a transmitted signal, in particular an ultra-wideband transmitted signal, through a communications channel system. The radio system 1 can also have multiple transmitters 10 for the respective transmitting of an ultra-wideband transmitted signal and/or multiple receivers 20 for the respective receiving of a received signal based on an ultra-wideband transmitted signal. Consequently, the detection of a change in the communications channel system can be especially reliable.

Figure 7:
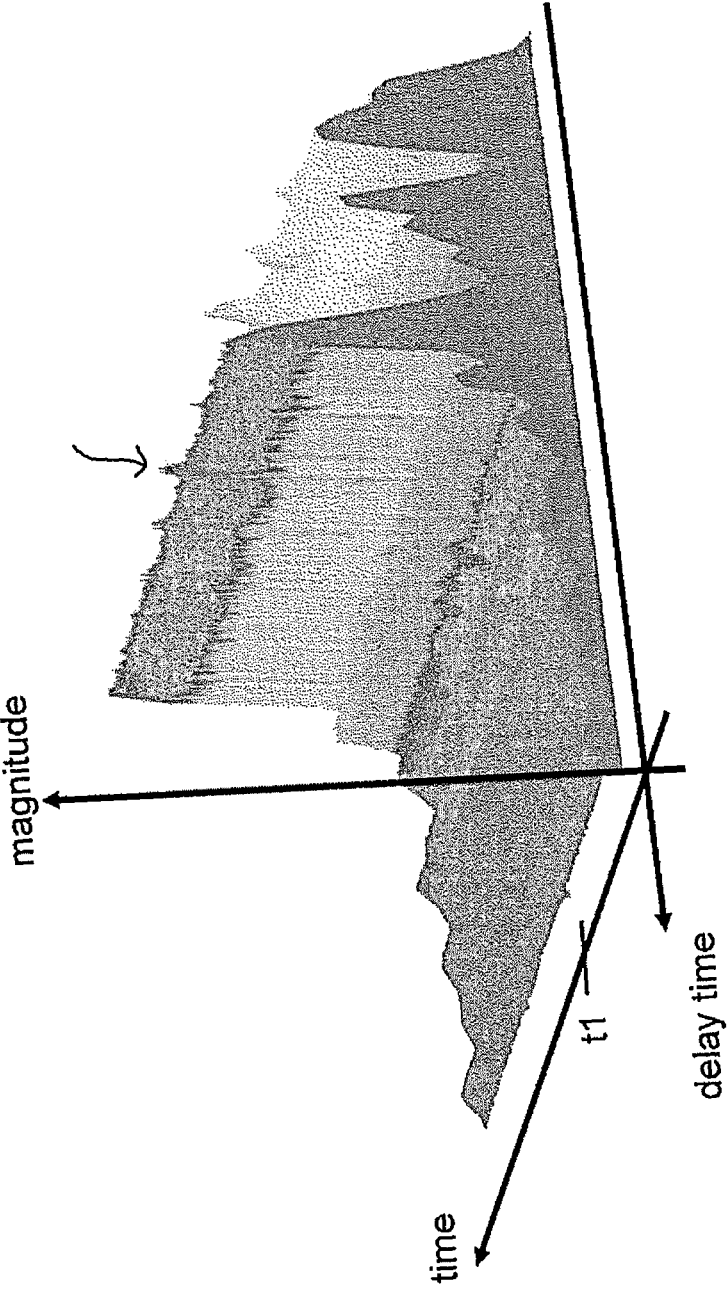
FIG. 7 is by way of example, a multiplicity of adapted channel impulse responses in a communications channel over time.

By way of example, FIG. 7 shows a multiplicity, in particular a large number, of channel impulse responses adapted according to the invention over time. A single adapted channel impulse response here is a function over a delay time. A multipath propagation of the ultra-wideband transmitted signal of the channel impulse response becomes detectable via the delay time. In particular, the local maxima indicate time-delayed echoes and/or reflectors of the communications channel. For instance, engineering inaccuracies of a receiver, such as sampling inaccuracies and associated time shifts in the delay time direction, and/or amplitude variations in terms of magnitude, are taken into account via the adapting according to the invention of the determined channel impulse responses to a known channel impulse response of the at least one communications channel of the vehicle to produce the depicted adapted channel impulse responses. Consequently, a "quiet" time sequence of multiple channel impulse responses over time can be produced. In particular, at least at one characteristic point, for example a maximum of the adapted channel impulse responses, can that a change in a communications channel over time consequently becomes detectable. In FIG. 7, it becomes detectable via the channel impulse responses adapted according to the invention that the communications channel has changed at least once over time, for example at the time t1 or in a time range around the time t1. The maximum of the adapted channel impulse responses at a (determinable) delay time has a detectable change in magnitude (see arrow in FIG. 7) in this case, namely an increase.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to detect a change in a communications channel system of a vehicle having at least one communications channel, the method comprising: transmitting an ultra-wideband transmitted signal through the communications channel system via a transmitter; receiving at least one received signal based on the ultra-wideband transmitted signal via a receiver; determining at least one channel impulse response of the at least one communications channel of the vehicle based on the received signal via a determination unit; repeating the steps of transmitting, receiving, and determining multiple times in order to determine at least a multiplicity of channel impulse responses of the at least one communications channel; respective adapting of at least a portion of the determined channel impulse responses of the multiplicity of channel impulse responses of the at least one communications channel to a known channel impulse response of the at least one communications channel of the vehicle to produce a respective adapted channel impulse response via an adapting unit in such a manner that a correlation coefficient resulting from the determined channel impulse response and the known channel impulse response increases; filtering at least a portion of the adapted channel impulse responses of, at a minimum, the at least one communications channel in a time direction via a filter unit to obtain a specific filter signal of the filtered, adapted channel impulse responses of the at least one communications channel; and detecting the change in the communications channel system at least on the basis of the specific filter signal of the at least one communications channel via a detection unit.

2. The method according to claim 1, wherein the specific filter signal of the at least one communications channel is compared with a specified signal for the at least one communications channel for the purpose of detecting the change in the communications channel system on the basis of at least the specific filter signal of the at least one communications channel.

3. The method according to claim 1, wherein, for the purpose of detecting the change in the communications channel system at least on the basis of the specific filter signal of the at least one communications channel, an average value is calculated from at least a portion of the specific filter signal of the at least one communications channel, wherein the calculated average value is compared with a threshold value.

4. The method according to claim 1, wherein the determined channel impulse response is shifted with respect to the known channel impulse response for the respective adapting of the at least one portion of the determined channel impulse responses to the known channel impulse response of the at least one communications channel to increase the correlation coefficient.

5. The method according to claim 1, wherein the determined channel impulse response is scaled with respect to the known channel impulse response of the communications channel for the respective adapting of the at least one portion of the determined channel impulse responses of the at least one communications channel to the known channel impulse response of the at least one communications channel to increase the correlation coefficient.

6. The method according to claim 1, wherein the determined channel impulse response is interpolated in order to add at least one auxiliary interpolation point between two interpolation points of the determined channel impulse response for the respective adapting of the at least one portion of the determined channel impulse responses of the at least one communications channel to the known channel impulse response of the at least one communications channel to increase the correlation coefficient.

7. The method according to claim 1, wherein at least a portion of the determined channel impulse responses of the multiplicity of channel impulse responses of the at least one communications channel are each adapted to a channel impulse response of the at least one communications channel based on a channel impulse response determined earlier in time.

8. The method according to claim 1, wherein at least a portion of the determined channel impulse responses of the multiplicity of channel impulse responses of the at least one communications channel are adapted to the same known channel impulse response of the at least one communications channel.

9. The method according to claim 1, wherein a determined channel impulse response of the multiplicity of channel impulse responses of the at least one communications channel is adapted to the known channel impulse response of the at least one communications channel of the respective adapted channel impulse response in such a manner that the correlation coefficient that results from the determined channel impulse response and the known channel impulse response is maximized.

10. The method according to claim 1, wherein the filtering of at least a portion of the adapted channel impulse responses of the at least one communications channel in the time direction is accomplished via a high-pass filter.

11. The method according to claim 1, wherein the ultra-wideband transmitted signal has at least one sounding signal or at least two different sounding signals.

12. The method according to claim 1, wherein multiple adapted channel impulse responses of the at least one communications channel of the vehicle are offset against one another or averaged to form a substitute channel impulse response chronologically before the filtering.

13. The method according to claim 1, wherein multiple receivers each receive a received signal based on the transmitted ultra-wideband transmitted signal in order to detect the change in the communications channel system of the vehicle.

14. The method according to claim 1, wherein multiple transmitters each transmit an ultra-wideband transmitted signal in order to detect the change in the communications channel system of the vehicle.

15. The method according to claim 14, wherein the transmitting of the ultra-wideband transmitted signals via the multiple transmitters takes place in a time-shifted manner.

16. A radio system to detect a change in a communications channel system of a vehicle having at least one communications channel, wherein the radio system is configured to carry out the method according to claim 1.

17. A radio module for a radio system to detect a change in a communications channel system of a vehicle having at least one communications channel, the radio module comprising:

at least one transmitter to transmit an ultra-wideband transmitted signal;

at least one receiver to receive a received signal based on the ultra-wideband transmitted signal;

a determination unit to determine at least one channel impulse response of at least one communications channel of the vehicle based on the received signal;

an adapting unit to adapt at least one determined channel impulse response of a multiplicity of channel impulse responses to a known channel impulse response of the at least one communications channel of the vehicle to produce a respective adapted channel impulse response in such a manner that a correlation coefficient resulting from the determined channel impulse response and the known channel impulse response increases;

a filter unit to filter at least a portion of the adapted channel impulse responses of, at a minimum, the at least one communications channel in a time direction to obtain a specific filter signal of the filtered, adapted channel impulse responses of the at least one communications channel; and a detection unit to detect the change in the communications channel system at least on the basis of the specific filter signal of the at least one communications channel.

18. A radio system comprising:

at least one radio module according to claim 17; and the at least one transmitter to transmit a transmitted signal or the ultra-wideband transmitted signal through a communications channel system.

* * * * *